United States Patent
Shirokoshi

(10) Patent No.: US 11,118,668 B2
(45) Date of Patent: Sep. 14, 2021

(54) STRAIN WAVE GEARING

(71) Applicant: HARMONIC DRIVE SYSTEMS INC., Tokyo (JP)

(72) Inventor: Norio Shirokoshi, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 123 days.

(21) Appl. No.: 16/629,327

(22) PCT Filed: Aug. 9, 2017

(86) PCT No.: PCT/JP2017/028893
§ 371 (c)(1),
(2) Date: Jan. 8, 2020

(87) PCT Pub. No.: WO2019/030843
PCT Pub. Date: Feb. 14, 2019

(65) Prior Publication Data
US 2021/0140529 A1    May 13, 2021

(51) Int. Cl.
*F16H 49/00* (2006.01)
*F16C 35/06* (2006.01)

(52) U.S. Cl.
CPC .......... *F16H 49/001* (2013.01); *F16C 35/06* (2013.01); *F16C 2361/61* (2013.01); *F16H 2049/003* (2013.01)

(58) Field of Classification Search
CPC .................................................. F16H 49/001
(Continued)

(56) References Cited

U.S. PATENT DOCUMENTS 4,425,822 A * 1/1984 Marschner .............. F16H 57/04
74/640
4,601,216 A * 7/1986 Inoue .................... F16H 49/001
74/640
(Continued)

FOREIGN PATENT DOCUMENTS

DE  102015223419 A1  11/2016
JP  S60129546 U  8/1985
(Continued)

OTHER PUBLICATIONS

International Search Report (PCT/ISA/210) dated Oct. 31, 2017, by the Japanese Patent Office as the International Searching Authority for International Application No. PCT/JP2017/028893.
(Continued)

*Primary Examiner* — Ha Dinh Ho
(74) *Attorney, Agent, or Firm* — Buchanan Ingersoll & Rooney PC

(57) ABSTRACT

A strain wave gearing wherein the outer circumferential surface of an outer ring of a wave generator is in contact with an inner-circumferential-surface portion of a flexible externally toothed gear, and a release groove, which is not in contact with the outer circumferential surface, is formed in the inner-circumferential-surface portion. The release groove is formed in a region containing a ball raceway groove. The groove depth of the release groove gradually increases from both sides of the groove in the groove width direction toward a deepest portion of the groove provided at an intermediate portion in the groove width direction. By providing the release groove, it is possible to smooth the distribution of pressing force of the wave generator acting on the externally toothed gear in the tooth-trace direction. In addition, the tooth root fatigue strength and the transmission
(Continued)

torque capacity of the externally toothed gear can be improved.

5 Claims, 3 Drawing Sheets

(58) Field of Classification Search
USPC .......................................................... 74/640
See application file for complete search history.

(56) References Cited

U.S. PATENT DOCUMENTS

| | | | | |
|---|---|---|---|---|
| 7,297,087 B2* | 11/2007 | Degen | ................... | F16H 1/2809 |
| | | | | 184/7.1 |
| 8,191,439 B2* | 6/2012 | Kobayashi | .......... | F16H 25/2409 |
| | | | | 74/89.23 |
| 8,516,924 B2* | 8/2013 | Pen | ....................... | F16H 49/001 |
| | | | | 74/640 |
| 9,003,924 B2* | 4/2015 | Kanai | ................... | F16H 49/001 |
| | | | | 74/640 |
| 9,021,919 B2* | 5/2015 | Takahashi | ............. | F16H 49/001 |
| | | | | 74/640 |

FOREIGN PATENT DOCUMENTS

| | | |
|---|---|---|
| JP | S61206154 U | 12/1986 |
| JP | H10159917 A | 6/1998 |
| JP | 2009133414 A | 6/2009 |
| JP | 2009156462 A | 7/2009 |
| JP | 2017110705 A | 6/2017 |
| WO | 2013175531 A1 | 11/2013 |
| WO | 2016092636 A1 | 6/2016 |

OTHER PUBLICATIONS

Written Opinion (PCT/ISA/237) dated Oct. 31, 2017, by the Japanese Patent Office as the International Searching Authority for International Application No. PCT/JP2017/028893.

* cited by examiner

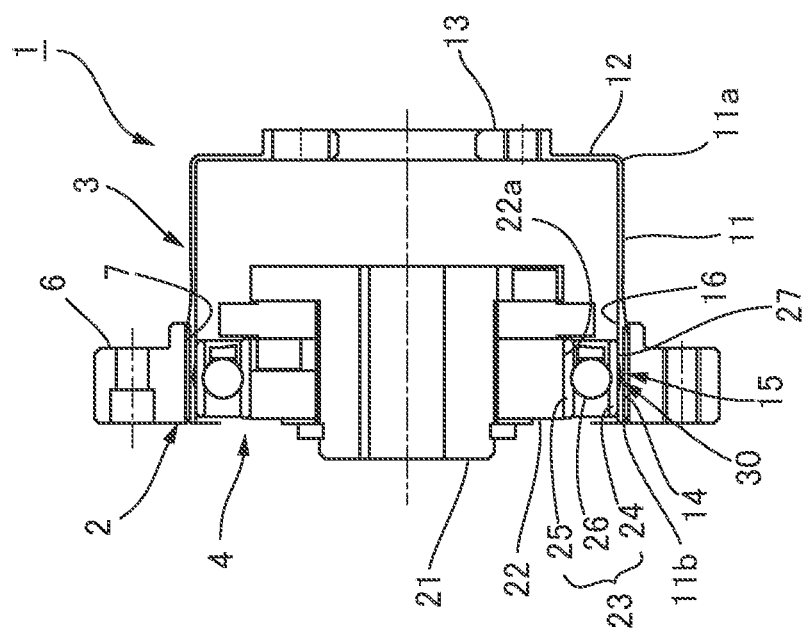
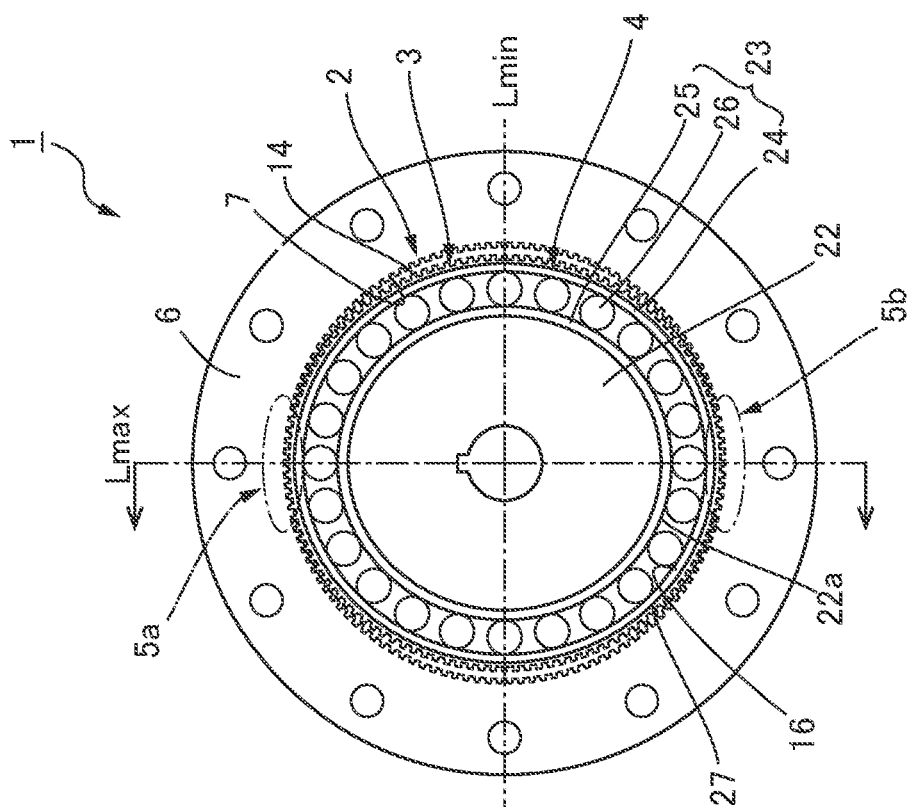

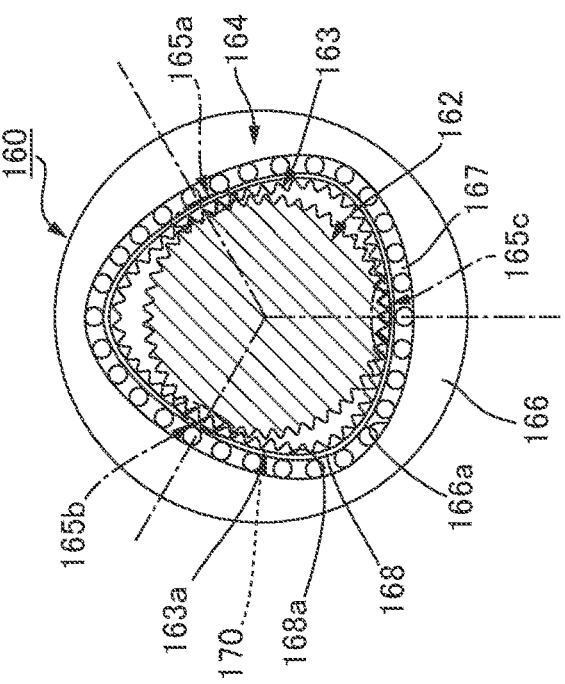
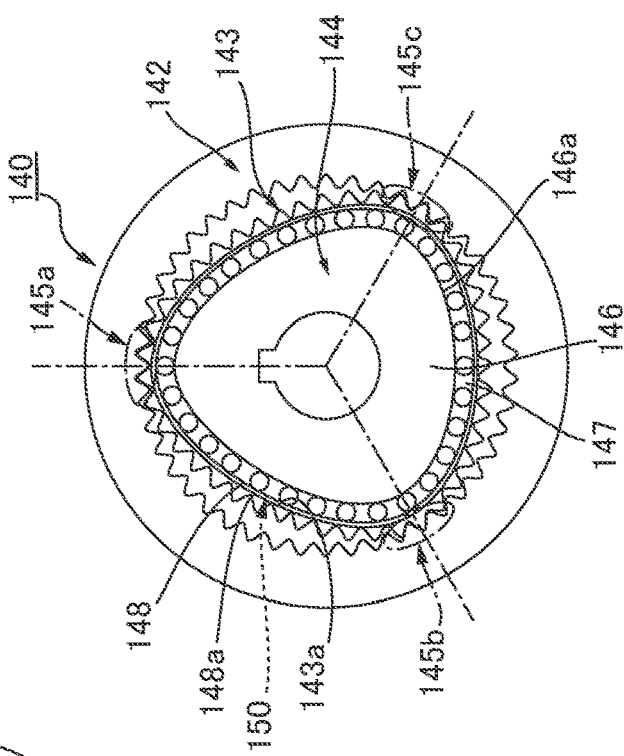
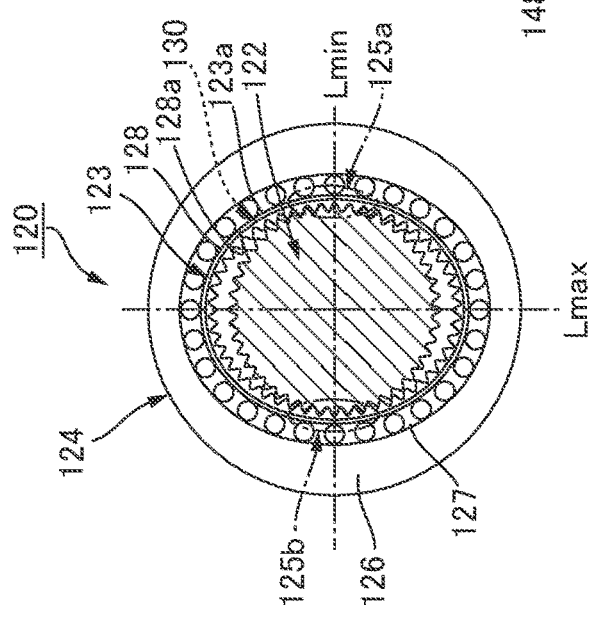

STRAIN WAVE GEARING

TECHNICAL FIELD

The present invention relates to a strain wave gearing capable of reducing stress generated in a flexible gear which is flexed into a non-circular shape by a wave generator.

BACKGROUND ART

A typical strain wave gearing is provided with a rigid internal gear, a flexible external gear, and a wave generator. The external gear is partially meshed with the internal gear by being flexed in the radial direction by the wave generator. When the wave generator is rotated, the meshing position of both gears is moved in the circumferential direction, and relative rotation caused by the difference in the number of teeth thereof is generated between both gears.

A wave generator generally is provided with a rigid plug of an elliptical contour and a wave bearing mounted on the outer circumferential surface of the plug. The wave bearing is provided with an outer ring and an inner ring which can be bent in a radial direction, and a plurality of balls mounted in a rotatable state between the outer ring and the inner ring. The wave bearing is mounted between a non-circular outer circumferential surface of the rigid plug and an inner circumferential surface of the external gear, and supports the external gear and the rigid plug in a relatively rotatable state.

For example, the rigid plug of the wave generator is a rotation input element, and the internal gear or the external gear is a reduced-speed rotation output element. The rigid plug rotates while repeatedly displacing each portion of the wave bearing and the external gear in a radial direction. The inner ring of the wave bearing rotates at high speed with the rigid plug, and the outer ring thereof is rotated integrally with the external gear. The balls inserted between the inner and outer rings roll along the raceway surfaces of the outer ring and the inner ring. Thus, the rigid plug and the external gear can be smoothly rotated relative to each other with a small torque.

A strain wave gearing having an external gear of a cup shape or a silk-hat shape is described in Patent document 1. A flat-type strain wave gearing having a cylindrical external gear is described in Patent document 2.

PRIOR ART DOCUMENTS

Patent Documents

Patent document 1: WO2016/092636
Patent document 2: JP 2009-156462 A

SUMMARY OF THE INVENTION

Problem to be Solved by the Invention

In a strain wave gearing, torque transmission is performed through a meshing portion between an internal gear and an external gear. The tooth bottom fatigue strength in the external teeth of the external gear is an important factor in determining the transmission torque. To enhance the tooth bottom fatigue strength of external teeth, it is effective to reduce stress generated at the bottom of the teeth. The pressing force of the wave generator (ball load), which is for flexing the external gear, is increased at a ball center position in the tooth trace direction of the external teeth. It is advantageous to improve the tooth bottom fatigue strength of the external gear and the transmission torque capacity of the gearing if the distribution in the tooth trace direction of the pressing force of the wave generator can be made smooth.

An object of the present invention is to provide a strain wave gearing capable of reducing stress generated in an external gear by making a distribution in a tooth trace direction of a pressing force smooth, the pressing force being applied to an external gear from a wave generator.

Means of Solving the Problems

A strain wave gearing of the present invention is provided with a rigid gear, a flexible gear which can be meshed with the rigid gear, and a wave generator that flexes the flexible gear into a non-circular shape to partially mesh with the rigid gear and moves a meshing position in the circumferential direction. The wave generator is provided with a rigid plug and a wave bearing disposed between the flexible gear and the rigid plug. In addition, the strain wave gearing is provided with one line of a release groove that is formed in a surface contact portion between the flexible gear and the wave bearing and extends in the circumferential direction. The wave bearing is provided with a pair of flexible bearing rings and a plurality of balls disposed between them. One of the bearing rings is a first bearing ring forming the surface contact portion with the flexible gear, and the release groove is formed on the flexible gear and/or the first bearing ring, and is formed on at least an outer peripheral surface of the first bearing ring that comes in contact with the flexible gear.

The release groove is formed in a region in the surface contact portion, in which the region corresponds to an area where the ball raceway groove is formed in the first bearing ring, or the region encompasses the area. The groove width of the release groove is the same as or larger than the raceway width of the ball raceway groove. The groove depth of the release groove gradually increases from the groove ends on both sides in the groove width direction toward the deepest part of the groove formed in the middle of the groove width direction.

In the present invention, a release groove having a predetermined width is formed in the surface contact portion between the flexible gear and the wave generator. With the formation of the release groove, there is formed a portion in the surface contact portion where the flexible gear and the wave generator do not come into contact with each other, and the portion is formed in a region including the ball center at which the pressing force of the wave generator acting on the flexible gear is maximized. The distribution of the pressing force acting on the flexible gear in a tooth trace direction can therefore be made smooth. As a result, the maximum stress generated in the tooth bottom portion of the flexible gear can be reduced, and the transmission torque capacity of the flexible gear can be increased.

When a strain wave gearing is provided with an internally toothed gear as the rigid gear and an externally toothed ear as the flexible gear, the wave generator is coaxially disposed inside the externally toothed gear, and a surface contact portion is formed between the outer peripheral surface of the outer ring of the wave bearing and the inner peripheral surface of the externally toothed gear.

In the case of a flat type strain wave gearing, in general, the ball center of the wave bearing is located at the center of a tooth trace direction of external teeth. Therefore, the center of the release groove in the groove width direction is set to a position corresponding to the center of the ball, and the groove width of the release groove is set to be the same as the width of the ball raceway groove. In addition, the groove depth of the release groove is gradually increased from the groove ends on both sides in the groove width direction to the deepest part of the groove positioned at the center in the groove width direction. The groove depth of the deepest part of the groove is preferably 0.02 mm or less.

In the case of a cup type or silk-hat type strain wave gearing, an externally toothed gear is that of a cup shape or a silk-hat shape provided with a cylindrical barrel part, a diaphragm extending in a radial direction from one end of the cylindrical barrel part, and external teeth formed on an outer peripheral surface portion on the side of an opening end which is the other end of the cylindrical barrel part. In the externally toothed gear of this shape, deflection called as "coning" is generated by a wave generator. In this case, the ball center of the wave bearing may be shifted to the side of the opening end of the externally toothed gear with respect to the center of the external teeth in the tooth trace direction.

Thus, in the case of the cup type or silk-hat type strain wave gearing, the groove width of the release groove is made wider than the width of the ball raceway groove; the groove end on the side of the opening end out of the groove ends of the release groove is located at a position corresponding to the end of the ball raceway groove on the side of the opening end; and the deepest part of the groove of the release groove is positioned between the position corresponding to the center of the ball and the position corresponding to the center of the effective tooth width of the external teeth.

For example, the groove width of the release groove is made to be in a range from the same width as the raceway width of the ball raceway groove to the width of 1.1 times the raceway width; the groove end on the side of the opening end out of the groove ends of the release groove is set to a position corresponding to the end on the side of the opening end in the ball raceway groove; and the deepest part of the groove of the release groove is positioned between the position corresponding to the ball center and the position at a distance of 0.1 times the raceway width from the position corresponding to the ball center to the side of the diaphragm. When the release groove is formed in this way, the deepest part of the groove of the release groove can be positioned in a region where a large pressing force is applied. In this case, it is also desirable that the groove depth of the deepest part of the groove be 0.02 mm or less.

When applied to individual devices, the width, depth, and shape of the release groove may be determined within a range satisfying the above conditions and mainly in consideration of a contact surface pressure and Young's modulus between an inner peripheral surface portion of the externally toothed gear and an outer peripheral surface of the outer ring.

BRIEF DESCRIPTION OF THE DRAWINGS

FIG. 1A is a schematic end view of a strain wave gearing according to the present invention;

FIG. 1B is a schematic cross-sectional view of the strain wave gearing of FIG. 1A;

FIG. 3A is an explanatory view illustrating an example of a strain wave gearing to which the present invention can be applied;

FIG. 3B is an explanatory view illustrating an example of a strain wave gearing to which the present invention can be applied; and FIG. 3C is an explanatory view illustrating an example of a strain wave gearing to which the present invention can be applied.

MODE FOR CARRYING OUT THE INVENTION

Figure 2A:
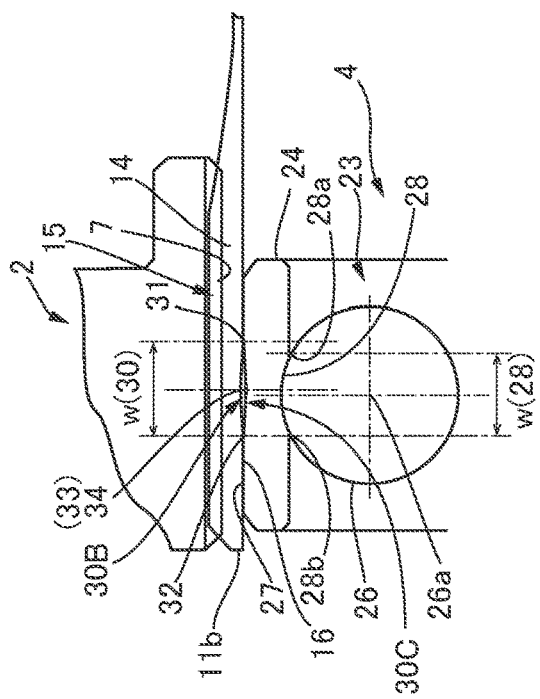
FIG. 2A is an enlarged partial cross-sectional view illustrating a portion where a release groove is formed in FIG. 1B.

An embodiment of a strain wave gearing to which the present invention is applied is described below with reference to the drawings. The following embodiment relates to a cup type strain wave gearing. The present invention is equally applicable to a silk hat type strain wave gearing and a flat type strain wave gearing.

FIG. 1A is a schematic end view of a strain wave gearing according to the present embodiment, and FIG. 1B is a schematic longitudinal cross-sectional view thereof. As shown in these figures, a strain wave gearing 1 is provided with an annular rigid internally toothed gear 2 (a rigid gear), a cup-shaped flexible externally toothed gear 3 (flexible gear) disposed coaxially inside the internally toothed gear, and a wave generator 4 fitted to the inside of the externally toothed gear.

The externally toothed gear 3 is flexed into an elliptical shape by the wave generator 4. The externally toothed gear 3, which is flexed by the wave generator 4, is formed with a meshing portion that meshes with the internally toothed gear 2 at two positions on both ends of a major axis Lmax of the elliptical shape. In FIG. 1A, portions surrounded by one-dotted chain lines are the meshing portions 5a and 5b.

When the wave generator 4 is rotated by a motor or the like (not shown), the meshing portions 5a and 5b of the both gears 2 and 3 are moved in the circumferential direction of the internally toothed gear 2. When the meshing portions 5a and 5b are rotated once, relative rotation is generated between both gears 2 and 3 by an amount corresponding to the difference in the number of teeth of both gears 2 and 3. The difference in the number of teeth between the internally toothed gear 2 and the externally toothed gear 3 is 2n (n is a positive integer), for example, two (n=1). For example, when the internally toothed gear 2 is fixed so as not to rotate, the rotation of the wave generator 4 can be taken out from the side of the externally toothed gear 3 as a greatly-reduced-speed rotation.

The internally toothed gear 2 is provided with an annular member 6 having a generally rectangular cross section and internal teeth 7 formed on a circular inner peripheral surface of the annular member 6. The externally toothed gear 3 is provided with a cylindrical barrel part 11 which can be flexed in a radial direction, a disk-shaped diaphragm 12 extending radially inward from a rear end 11a of the cylindrical barrel part 11, an annular boss 13 which is a rigid body connected to an inner periphery of the diaphragm 12, and an external teeth 14 formed on an outer peripheral surface portion on the side of the opening end 11b of the cylindrical barrel part 11.

The wave generator 4 is provided with a cylindrical rigid hub 21, a rigid wave plug 22 attached to the outer peripheral surface of the hub, and a wave bearing 23 attached to an outer peripheral surface 22a of an elliptical contour of the wave plug 22. The wave bearing 23 is provided with a flexible outer ring 24, a flexible inner ring 25, and a plurality of balls 26 rotatably disposed therebetween. An outer-ring outer peripheral surface 27 of the wave bearing 23, which is attached to an outer peripheral surface 22a of the wave plug 22, is flexed into an elliptical contour. The cylindrical barrel part 11 of the externally toothed gear 3 has an external-tooth forming portion 15 where the external teeth 14 are formed, the external-tooth forming portion being pressed outward from the inside by an outer-ring outer peripheral surface 27 and is flexed into an elliptical shape corresponding to the contour shape of the outer-ring outer peripheral surface.

In the surface contact portion between the externally toothed gear 3 and the wave generator 4, one line of a release groove 30 is formed to extend in the circumferential direction. The surface contact portion is formed between an inner peripheral surface portion 16 of the external-tooth forming portion 15 of the externally toothed gear 3 and an outer-ring outer peripheral surface 27 of the wave bearing 23 of the wave generator 4. The release groove 30 is formed on at least one of the inner peripheral surface portion 16 and the outer-ring outer peripheral surface 27 and, in this example, is formed on the outer-ring outer peripheral surface 27.

FIG. 2A is an enlarged partial cross-sectional view illustrating a portion where the release groove 30 is formed. The outer ring 24 of the wave bearing 23 has an inner peripheral surface formed with a ball raceway groove 28 composed of a curved surface of a predetermined curvature. The ball raceway groove 28 has a constant raceway width w2. The center of the ball raceway groove 28 in the width direction thereof is coincident with the ball center 26a.

The release groove 30 has a groove width w1 which is equal to or larger than the raceway width w2 of the ball raceway groove 28 formed in the outer ring 24. In this example, the dimension of the groove width is 1.1 times the raceway width w2.

In addition, the release groove 30 has groove ends 31 and 32 on both sides thereof in the groove width direction (the tooth trace direction of the external teeth 14), out of which the groove end 32 at the side of the opening end 11b of the externally toothed gear 3 is located at a position corresponding to an end 28b of the ball raceway groove 28 on the side of the opening end 11b. Therefore, in this example, the other groove end 31 of the release groove 30 is located at a position 0.1 times the raceway width w2 from the other end 28a of the ball raceway groove 28. The release groove 30 has a center 33 in the groove width direction which is located at the diaphragm side with respect to the ball center 26a.

The release groove 30 has a groove deepest part 34 which is formed between a position corresponding to the ball center 26a and a position corresponding to the center 14a of the effective tooth width w3 of the external teeth 14. In this example, it is formed between the ball center 26a and a position at a distance of 0.1 times the raceway width w2 from the ball center 26a toward the diaphragm side. For example, the groove deepest part 34 is located at the center 33 in the groove width direction. The groove depth of the groove deepest part 34 is set to 0.02 mm or less. Further, the groove depth of the release groove 30 is gradually increased from the groove ends 31 and 32 on both sides in the groove width direction to the groove deepest part 34.

The strain wave gearing 1 of this embodiment has the release groove 30 formed in the surface contact portion between the externally toothed gear 3 and the wave generator 4. In other words, the portion, which encompasses the position immediately above the balls between the inner peripheral surface portion 16 of the externally toothed gear 3 and the outer-ring outer peripheral surface 27 of the wave bearing 23, is released (separated) so as not to come into contact with each other. In the external-tooth forming portion 15 of the externally toothed gear 3, stress acting on the portion just above the balls can be alleviated. Specifically, the distribution in the tooth trace direction in the pressing force acting on the external-tooth forming portion 15 from the side of the wave bearing 23 can be made flat. Thereby, the tooth-flank load distribution of the external teeth 14 can be made flat, and the external teeth 14 can be properly meshed with the internal teeth 7 at each position in the tooth trace direction. The tooth bottom fatigue strength of the externally toothed gear 3 and the transmission torque capacity of the strain wave gearing are advantageously improved.

In addition, the release groove 30 functions as a lubricant reservoir between the inner peripheral surface portion of the externally toothed gear 3 and the outer peripheral surface of the outer ring of the wave bearing. This makes the lubricating reliability of these sliding surfaces to improve.

Figure 2B:
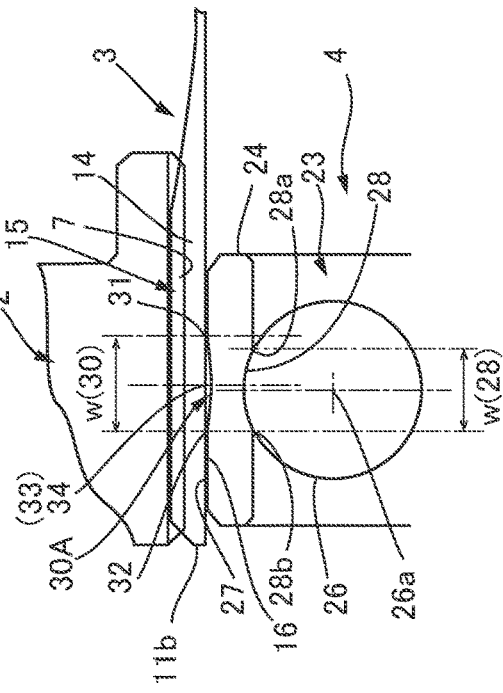
FIG. 2B is an enlarged partial cross-sectional view illustrating another example of the release groove.
Figure 2C:
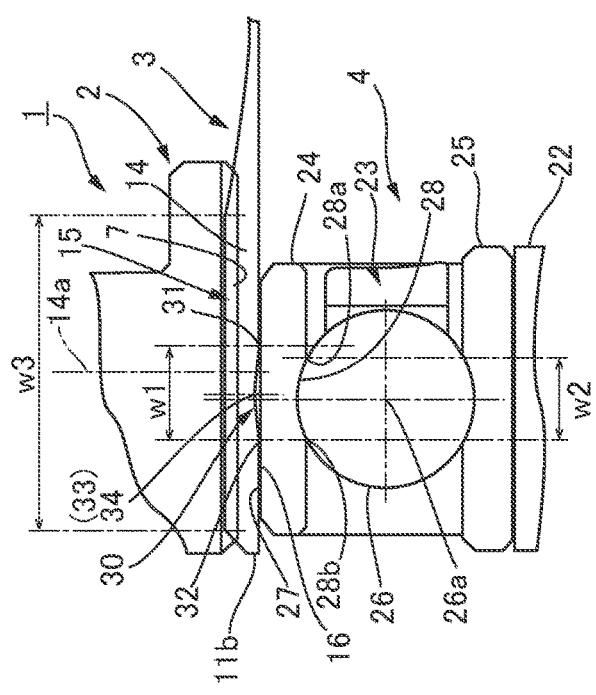
FIG. 2C is an enlarged partial cross-sectional view illustrating still another example of the release groove.

FIG. 2B is an enlarged partial cross-sectional view illustrating an example in which a release groove is formed on the side of the outer ring 24. Also in this case, the groove width, the shape and the forming range of a release groove 30A are the same as in the case of the release groove 30. As illustrated in FIG. 2C, release grooves 30B and 30C can be formed on both the inner peripheral surface portion 16 of the externally toothed gear 16 and the outer-ring outer peripheral surface 27. For example, the release grooves 30B and 30C are formed in a line-symmetrical shape. The sum of the groove depth of the respective groove deepest parts may be 0.02 mm or less. In FIGS. 2B and 2C, the same reference numerals are given to corresponding parts in FIG. 2A.

Other Embodiments

FIGS. 3A, 3B and 3C illustrate strain wave gearings to which the present invention are applicable. A strain wave gearing 120 illustrated in FIG. 3A has a rigid externally toothed gear 122 (a rigid gear) which is disposed at the innermost side. An annular flexible internally toothed gear 123 (flexible gear) is arranged in a state of concentrically surrounding the externally toothed gear 122. An annular wave generator 124 is arranged in a state of concentrically surrounding the internally toothed gear 123. The internally toothed gear 123 is flexed into an elliptical shape by the wave generator 124. The internally toothed gear 123 flexed by the wave generator 124 is formed with meshing portions 125a and 125b to the externally toothed gear 122 at two positions on both ends of a minor axis Lmin of the elliptical shape.

The wave generator 124 is provided with an annular rigid cam plate 126 and a wave bearing 127 mounted on the inner side of the cam plate. In the illustrated example, the wave bearing 127 has an outer ring integrally formed with the rigid cam plate 126. For example, when the wave generator 124 is rotated by a rotation drive source such as a motor, and the externally toothed gear 122 is fixed so as not to rotate, the meshing positions of both gears 122 and 123 are moved in the circumferential direction, and relative rotation corresponding to the difference in the number of teeth of both gears is generated between both gears. This rotation can be taken out from the internally toothed gear 123.

A release groove 130 is formed in a surface contact portion between an inner peripheral surface 128a of an inner ring 128 of a wave bearing 127 and an outer peripheral surface portion 123a of the flexible internally toothed gear 123. The release groove 130 is formed on an inner peripheral surface 128a, an outer peripheral surface portion 123a, or both.

A strain wave gearing 140 illustrated in FIG. 3B has a rigid internally toothed gear 142 (a rigid gear), a flexible externally toothed gear 143 (flexible gear) disposed inside of the internally toothed gear, and a non-circular contour wave generator 144 fitted to the inside of the externally toothed gear. The externally toothed gear 143 has a portion where external teeth are formed, the portion being flexed into a non-circular shape by the wave generator 144.

The wave generator 144 is provided with a rigid cam plate 146 of a non-circular contour and a wave bearing 147 mounted on the outer periphery of the cam plate. The rigid cam plate 146 has a non-circular outer peripheral surface 146a defined by a closed curve which can be inscribed in a plurality of places at equal intervals along the circumferential direction with respect to a perfect circle. In this example, the non-circular outer peripheral surface 146a is a three-lobe shape and is defined by a closed curve which can be inscribed in three places at equal intervals along the circumferential direction with respect to a perfect circle. It is also possible to define a non-circular outer peripheral surface by a closed curve which can be inscribed in a plurality of positions which are four or more positions equally spaced along the circumferential direction of a perfect circle.

With the wave generator 144 of this shape, the externally toothed gear 143 is flexed into a shape along a non-circular contour of the wave generator 144, and meshing portions 145a, 145b and 145c with respect to the internally toothed gear 142 are formed at three positions at an angular interval of 120 degrees.

The wave generator 144 is connected to a high-speed-rotation input shaft such as a motor shaft. When the wave generator 144 is rotated, the meshing positions of both gears 142 and 143 move in the circumferential direction, and relative rotation caused by the difference in the number of teeth is generated between both gears 142 and 143. For example, the internally toothed gear 142 is fixed so as not to rotate and the externally toothed gear 143 is connected to the load-side member, so that a reduced-speed rotation is taken out from the externally toothed gear 143 and is transmitted to the load-side member. The difference in the number of teeth of both gears 142 and 143 in this case is set to 3n (n is a positive integer).

A release groove 150 is formed in a surface contact portion between an outer peripheral surface 148a of an outer ring 148 of the wave bearing 147 of the wave generator 144 and an inner peripheral surface portion 143a of the flexible externally toothed gear 143. The release groove 150 is formed on the outer peripheral surface 148a, the inner peripheral surface portion 143a, or both.

A strain wave gearing 160 illustrated in FIG. 3C has a flexible internally toothed gear 163 (flexible gear) arranged outside a rigid externally toothed gear 162 (a rigid gear), and a wave generator 164 having an inner peripheral surface of a non-circular contour is disposed on the outer peripheral side of the internally toothed gear 163.

The wave generator 164 is provided with a rigid cam plate 166 having a non-circular inner peripheral surface 166a and a wave bearing 167 attached to the non-circular inner peripheral surface 166a. The non-circular inner peripheral surface 166a of the rigid cam plate 166 is defined by a closed curve which can be circumscribed at a plurality of places at equal intervals along the circumferential direction with respect to a perfect circle. In this example, the non-circular inner peripheral surface 166a is a three-lobe shape and is defined by a closed curve which can be circumscribed at three points at equal intervals along the circumferential direction with respect to a perfect circle. It is also possible to define a non-circular inner peripheral surface by a closed curve which can be circumscribed at four or more positions at equal intervals along the circumferential direction of the perfect circle.

The wave generator 164 of this shape makes the internally toothed gear 163 to flex into a shape along the non-circular contour of the wave generator, so that the meshing portions 165a, 165b and 165c with respect to the externally toothed gear 162 are formed at three locations at an angular interval of 120 degrees. For example, when the wave generator 164 is rotated by a rotation drive source such as a motor and the externally toothed gear 162 is fixed so as not to rotate, the meshing positions of both gears 162 and 163 are moved in the circumferential direction, and relative rotation corresponding to the difference in the number of teeth of both gears is generated between both gears. This rotation can be taken out from the internally toothed gear 163. The difference in the number of teeth of both gears 162 and 163 in this case is set to 3n (n is a positive integer).

A release groove 170 is formed in a surface contact portion between an inner peripheral surface 168a of the inner ring 168 of the wave bearing 167 of the wave generator 164 and an outer peripheral surface portion 163a of the flexible internally toothed gear 163. The release groove 170 is formed on the inner peripheral surface 168a, the outer peripheral surface portion 163a, or both.

The invention claimed is:
1. A strain wave gearing comprising:
a rigid gear;
a flexible gear capable of meshing with the rigid gear;
a wave generator having a rigid plug and a wave bearing disposed between the flexible gear and the rigid plug, the wave generator being configured to flex the flexible gear into a non-circular shape and partially mesh with the rigid gear, and to move a meshing position of the gears in a circumferential direction; and
one line of a release groove formed in a surface contact portion between the flexible gear and the wave bearing to extend in the circumferential direction,
wherein
the wave bearing has a pair of flexible bearing rings and a plurality of balls disposed between the bearing rings, and one of the bearing rings is a first bearing ring to form the surface contact portion with the flexible gear;
the release groove is formed at least on an outer peripheral surface of the first bearing ring out of the flexible gear and the first bearing ring, the outer peripheral surface being in contact with the flexible gear;
the release groove is formed in a region in the surface contact portion, wherein the region corresponds to an area of the first bearing ring where a ball raceway groove is formed;
a groove width of the release groove is equal to a raceway width of the ball raceway groove; and
a groove depth of the release groove is gradually increased from groove ends on both sides in a groove width direction toward a groove deepest part located in the middle of the release groove in the groove width direction,
wherein
the rigid gear is an internally toothed gear;
the flexible gear is an externally toothed gear coaxially disposed inside the internally toothed gear;
the wave generator is coaxially disposed inside the externally toothed gear;
the first bearing ring is an outer ring; and the surface contact portion is formed between an inner peripheral surface of the flexible gear and an outer peripheral surface of the first bearing ring, and wherein the external gear is the externally toothed gear having a cylindrical shape;

a center in the groove width direction of the release groove is located at a position corresponding to a center in a width direction of the ball raceway groove; and the groove depth of the release groove is gradually increased from the groove ends on the both sides in the groove width direction to the groove deepest part located at the center in the groove width direction.

2. The strain wave gearing according to claim 1, wherein the groove depth of the groove deepest part is equal to or less than 0.02 mm.

3. A strain wave gearing comprising:

a rigid gear;

a flexible gear capable of meshing with the rigid gear;

a wave generator having a rigid plug and a wave bearing disposed between the flexible gear and the rigid plug, the wave generator being configured to flex the flexible gear into a non-circular shape and partially mesh with the rigid gear, and to move a meshing position of the gears in a circumferential direction; and one line of a release groove formed in a surface contact portion between the flexible gear and the wave bearing to extend in the circumferential direction, wherein the wave bearing has a pair of flexible bearing rings and a plurality of balls disposed between the bearing rings, and one of the bearing rings is a first bearing ring to form the surface contact portion with the flexible gear;

the release groove is formed at least on an outer peripheral surface of the first bearing ring out of the flexible gear and the first bearing ring, the outer peripheral surface being in contact with the flexible gear;

the release groove is formed in a region in the surface contact portion, wherein the region encompasses an area of the first bearing ring where a ball raceway groove is formed;

a groove width of the release groove is larger than a raceway width of the ball raceway groove; and a groove depth of the release groove is gradually increased from groove ends on both sides in a groove width direction toward a groove deepest part located in the middle of the release groove in the groove width direction, wherein the rigid gear is an internally toothed gear;

the flexible gear is an externally toothed gear coaxially disposed inside the internally toothed gear;

the wave generator is coaxially disposed inside the externally toothed gear;

the first bearing ring is an outer ring; and the surface contact portion is formed between an inner peripheral surface of the flexible gear and an outer peripheral surface of the first bearing ring, and wherein the external gear is the externally toothed gear of a cup shape or a silk hat shape and has a cylindrical barrel part, a diaphragm extending radially from one end of the cylindrical barrel part, and external teeth formed on an outer peripheral surface portion at a side of an opening end of the cylindrical barrel part, the opening end being the other end of the cylindrical barrel part;

the groove width of the release groove is larger than the raceway width of the ball raceway groove;

one of the groove ends of the release groove, which is at the side of the opening end, is located at a position corresponding to an end at the side of the opening end of the ball raceway groove; and the groove deepest part of the release groove is located between a position corresponding to a center of the ball and a center of an effective tooth width of the external teeth of the externally toothed gear.

4. The strain wave gearing according to claim 3, wherein the groove width of the release groove is less than 1.1 times the raceway width of the ball raceway groove;

one of the groove ends of the release groove, which is at the side of the opening end, is located at a position corresponding an end of the ball raceway groove at the side of the opening end; and the groove deepest part of the release groove is located between the position corresponding to the center of the ball and a position at a distance of 0.1 times the raceway width from the position corresponding to the center of the ball to a side of the diaphragm.

5. The strain wave gearing according to claim 3, wherein the groove depth of the groove deepest part is equal to or less than 0.02 mm.

* * * * *